Jan. 26, 1937.  B. PRATT ET AL  2,068,705
OVEN VALVE
Filed Nov. 14, 1934  3 Sheets-Sheet 2
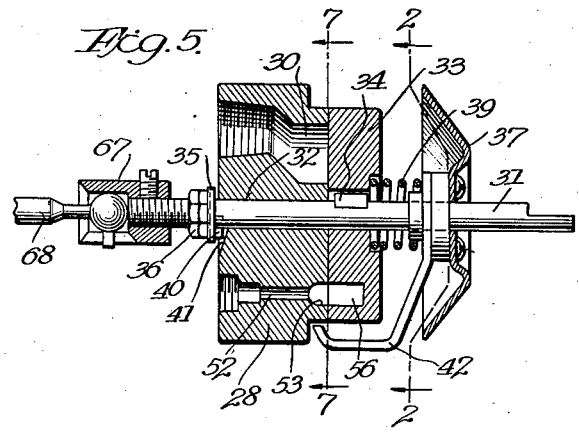
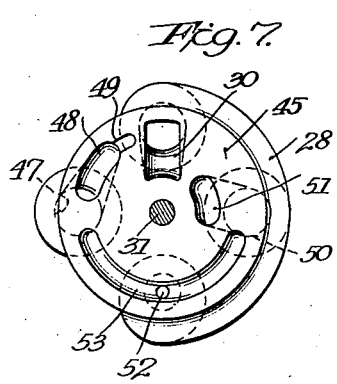
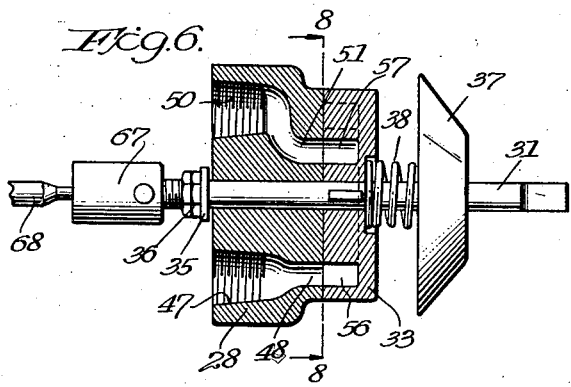
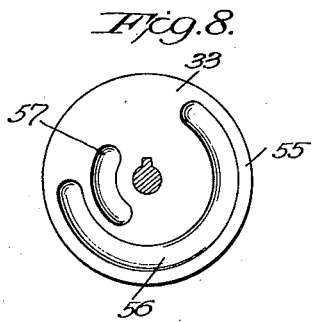
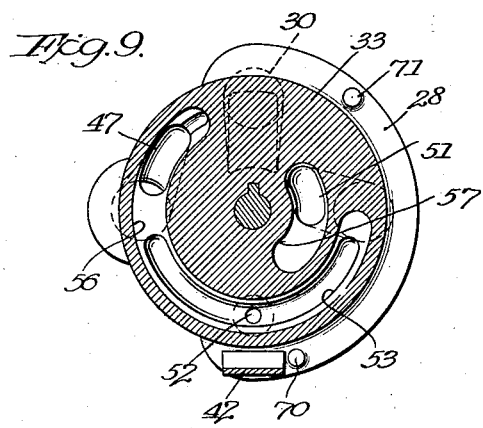
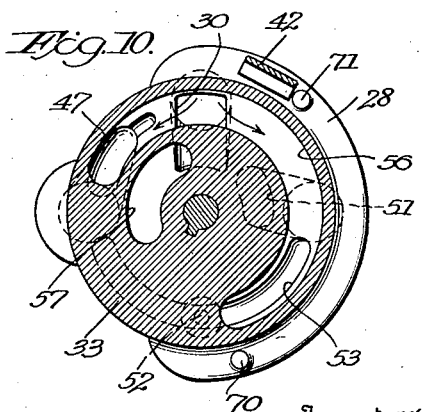
Inventors
Best Pratt,
George F. Weinreich.

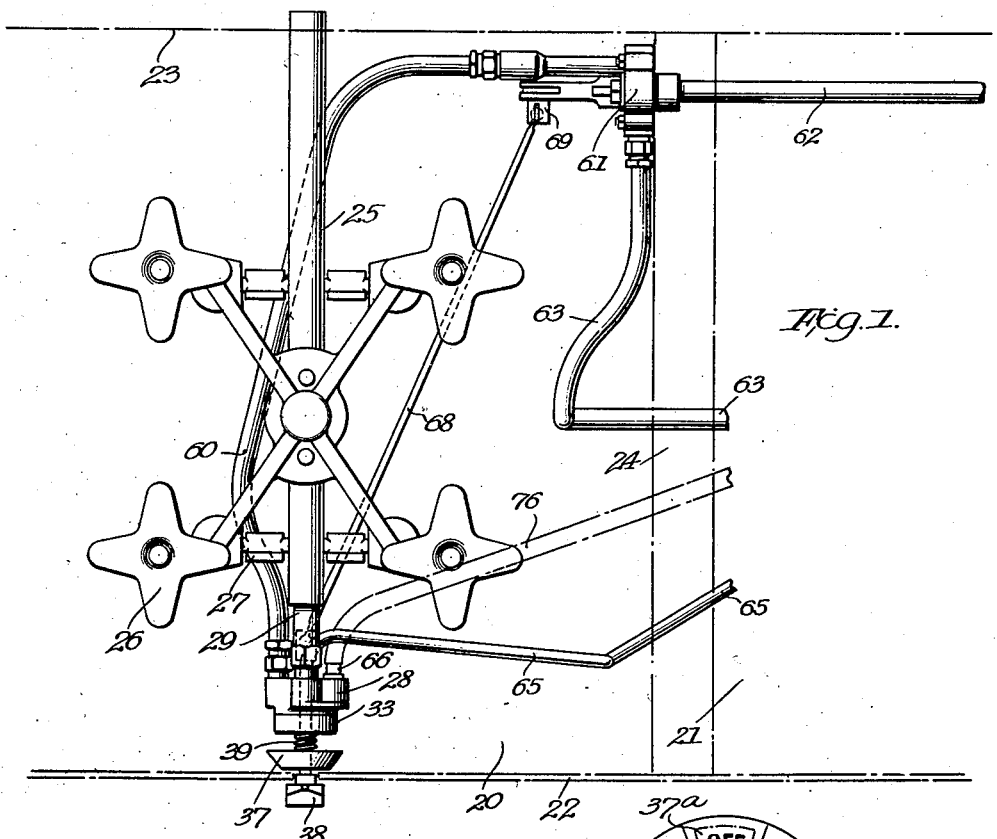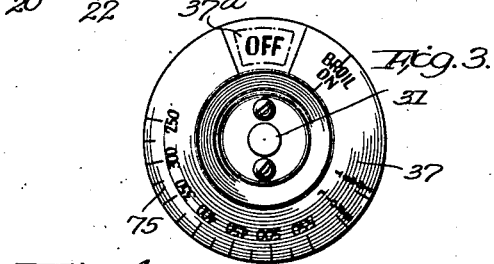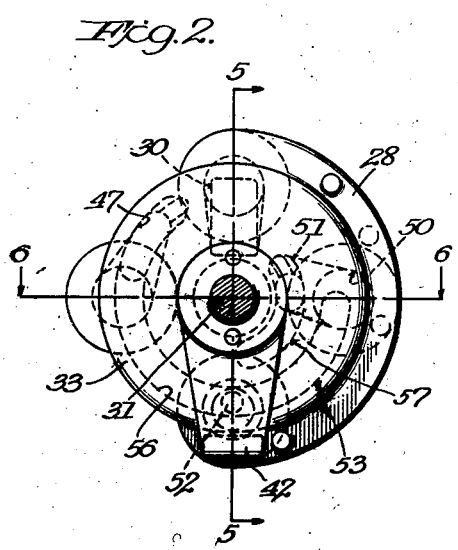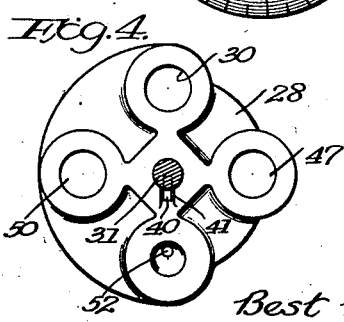

Jan. 26, 1937.  B. PRATT ET AL  2,068,705
OVEN VALVE
Filed Nov. 14, 1934   3 Sheets-Sheet 3
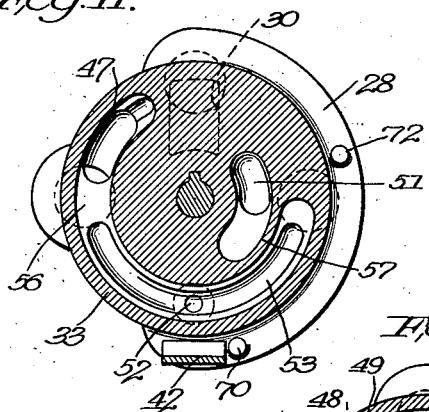
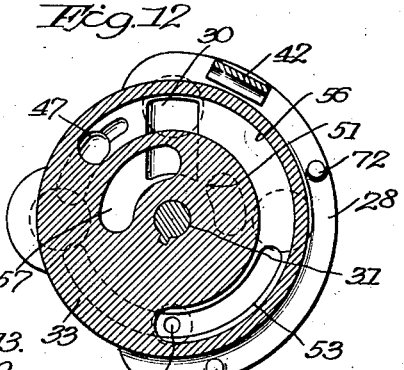
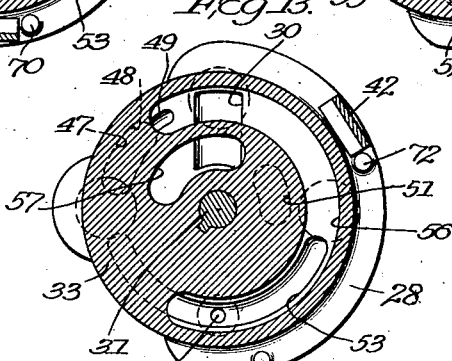
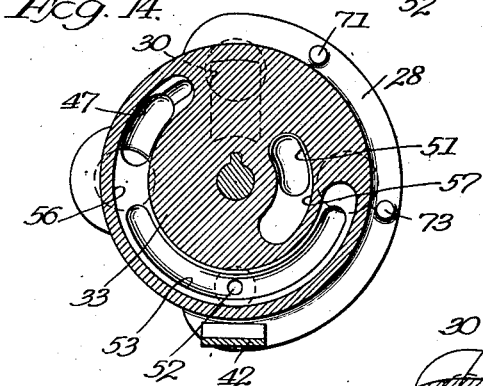
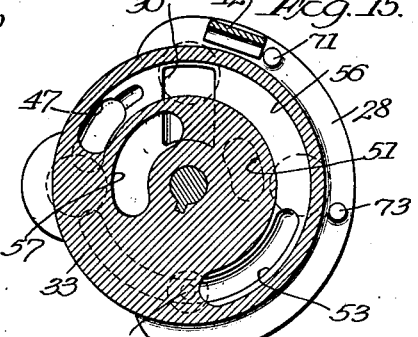
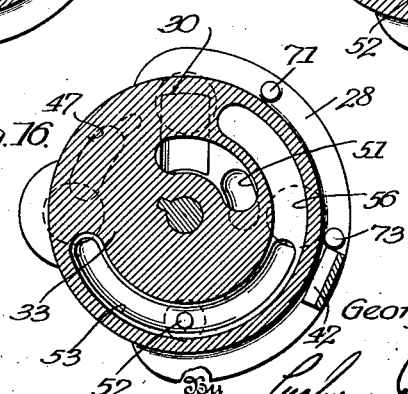
Inventors
Best Pratt
George F. Weinreich Patented Jan. 26, 1937

2,068,705

UNITED STATES PATENT OFFICE 2,068,705

OVEN VALVE

Best Pratt and George F. Weinreich, Chicago, Ill., assignors to Brake Equipment & Supply Company, Chicago, Ill., a corporation of Illinois Application November 14, 1934, Serial No. 753,056

10 Claims. (Cl. 251—90)

The present invention relates to an oven valve and, more particularly, to a valve for use in controlling the baking and broiling oven burners of gas ranges.

At the present time, the oven structures of ranges are of several types. For example, one type of range has an oven with a burner for roasting purposes only. A second type of range has an oven with a single burner arranged to be used either for roasting or for broiling, with a separate compartment for each operation, and a third type of range is provided with an oven or ovens having separate roasting and broiling burners. Heretofore, it has been necessary to provide a different type of valve to control the burner or burners of each type of range.

The principal object of the present invention is to provide a valve which may be used with any one of the three types of ranges mentioned above, the valve ports or passages being so arranged that the valve may be used on any one of the ranges without modification of the port or passage arrangement of the valve. Furthermore, the ports or passages are so designed that no modification of the piping of ranges of well-known types is necessary.

A further object of the invention is to provide a valve of extremely simple construction, but which will nevertheless be leakproof and readily operable under all conditions.

Another object of the invention is to provide a valve which may be used for controlling an oven valve of the thermostatic type.

Other objects and advantages of the invention will be apparent from the following specification and drawings, wherein:—

Figure 1 is a plan view diagrammatically showing the piping of a gas range equipped with the valve of the present invention;

Figure 2 is a vertical transverse sectional view showing the valve in front elevation, the view being taken on the line 2—2 of Figure 5;

Figure 3 is a front view of the dial which may be fixed upon the shaft of our valve;

Figure 4 is a rear view of the valve;

Figure 5 is a vertical sectional view of the valve, taken on the line 5—5 of Figure 2;

Figure 6 is a horizontal sectional view of the valve, taken on the line 6—6 of Figure 2;

Figure 7 is a view of the seat face of the valve body, being taken on the line 7—7 of Figure 5;

Figure 8 is a view of the seat face of the valve disc of our valve, being taken on the line 8—8 of Figure 6;

Figures 9 and 10 are diagrammatic views showing the ports or passages of the valve body and valve disc, the valve disc being shown in transverse vertical section, the two views showing two positions assumed by the valve disc when the valve is used for controlling a roasting burner only;

Figures 11 to 13 are views of the same type as Figures 9 and 10, showing three positions assumed by the valve disc when the valve is used to control a roasting and broiling burner; and Figures 14 to 16 are views of the same type as Figures 9 and 10, showing three positions assumed by the valve disc when the valve is used to control an oven provided with separate roasting and broiling burners.

Referring to Figure 1, the numeral 20 designates the top burner-box of a gas range while the numeral 21 indicates the oven of the range. The front and rear walls 22 and 23, respectively, of the range, and one side wall 24 of the oven are diagrammatically indicated by dotted lines. As is usual in more recent types of ranges, the gas supply manifold 25 extends from rear to front of the burner box, the top burners 26 being connected thereto and receiving gas through valves 27 which may be operated from the front wall 22 of the burner box by suitable connections, not shown.

The valve body 28 of the valve of the present invention is secured to the forward end of the stationary manifold 25 by a short section of piping 29, this length of piping being threaded into a supply passage 30 in the valve body to supply gas to the valve. A shaft or valve stem 31 is rotatable in a bore 32 centrally disposed in the valve body and the valve disc or element 33 is keyed to this shaft as at 34. As shown in Figures 5 and 6, a flanged washer 35 and locknuts 36 are provided on shaft 31 behind the valve body to limit the forward movement of the shaft. A dial 37 bearing various temperature readings has the hub thereof fixed to the shaft 31 adjacent the outer end of the latter, the dial 37 preferably being so positioned upon the shaft as to be within the front wall or front cover plate of the range, the latter being provided with a slight aperture 37a, (Figure 3) through which a portion of the dial will be exposed. An operating handle or knob 38 is secured to the forward end of shaft 31 as shown in Figure 1.

A coil spring 39 surrounds the shaft between the hub of dial 37 and the outer face of the valve disc 33, to hold the disc closely seated upon the valve body 28. When the valve disc is in closed position, a pin or key 40 (Figures 4 and 5) carried beneath the flanged washer 35 by shaft 31 is seated in a kerf 41 in the rear face of the valve body, holding the valve disc against rotation. However, it will be understood that the valve may be arranged to be latched in any desired position. Inward pressure upon the knob 38 and shaft 31 against the action of spring 39 will release the pin 40 from kerf 41, permitting the valve disc to be rotated.

As best shown in Figure 5, a stop arm 42 secured to the hub of dial 37 projects inwardly parallel to shaft 31 and is intended to contact with stop pins upon the valve body 28 to determine limit positions of the valve disc 33. The positioning of the stop pins is varied according to the type of oven which the valve is to control, this being the only change which need be made in the valve to accommodate it for its various purposes. The positioning of the stop pins will be fully described in connection with the operation of the valve.

The valve body 28 is substantially disc-like in shape and is provided with a planar front or seat face 45. As shown in Figures 5 and 7, the supply passage 30 opens to the seat face 45, the passage being offset axially of the valve body and the port through which it opens to the seat face preferably being substantially rectangular in shape and extending substantially radially of the seat face. A passage 47 also extends through the valve body, the port or groove 48 through which this passage opens to the seat face being arcuate, relatively short, and having rounded ends. The passage 47 is located at one side of the supply passage 30 and its seat face port or groove 48 is preferably arranged adjacent the edge of the seat face 45 as shown in Figure 7. An arcuate groove 49 is provided in the seat face, opening from the edge of the groove 48 adjacent the supply passage 30. The groove 49 is of less width than the groove 48 of passage 47. As will be hereinafter explained, the passage 47 is intended to be connected by suitable piping with the oven burner, which is of the usual type, or a thermostatic valve controlling the oven burner when the valve is used with certain types of ovens.

A passage 50 (Figures 6 and 7), hereinafter termed a broiler burner passage, also extends through the valve body 28, the port 51 through which this passage opens to the seat face 45 being arcuate and closer to the axial center of the seat face than is the port of the oven burner passage 47. The port 51 of passage 50 is also provided with rounded ends. When the oven valve is intended to control an oven used for broiling only, passage 50 will be connected to the burner of the oven.

A pilot light burner passage 52 (Figures 5 and 7), of less diameter than the other passages, opens to an arcuate groove 53 in the seat face 45, the groove 53 preferably being arranged between the ports 48 and 51 and also having rounded ends. As will be more fully explained, when the valve is to be used in connection with a thermostatic valve, the pilot burner passage 52 will be connected to a pilot burner in the oven.

It will be noted that oven burner port 48 and pilot burner groove 53 are equidistant from the axial center of the valve body 28.

As best shown in Figure 8, the seat face 55 of the valve disc or element 33 is provided with a relatively long arcuate groove or passage 56 having rounded ends and positioned adjacent the edge of the valve as shown in Figure 8. A second arcuate groove or passage 57, also provided with rounded ends, is provided in the seat face of the disc, within the groove 56, the groove 57 being considerably shorter than the groove 56. As indicated in Figure 6, the grooves 56 and 57 are preferably of substantially the same cross-sectional area.

It will be noted from various figures of the drawings, and particularly from Figure 15, that, when the valve disc or element 33 is mounted on the shaft 31 and against the valve body seat face 45, the length of the seat face port of the supply passage 30, radially of the seat face, is sufficient to permit this passage to be aligned with either of the grooves or passages 56 and 57 of the valve disc. Furthermore, the groove 56 of the disc and the ports of the valve body passages 47 and 52 will be equidistant from the axial center of the valve body. Also, the valve disc groove 57 and the port of the broiler burner passage 50 will be equidistant from the valve body axis.

When the valve of the present invention is to be used with a thermostatic valve 61 to control the oven burner, a fitting such as 67 is secured to the inner end of the valve shaft 31 as shown in Figures 5 and 6 and a rod 68 extends from the fitting 67 to the operating shaft 69 of the thermostatic valve. The ends of the rod 68 are preferably respectively joined to the fitting 67 and the operating shaft 69 in such a manner that it will provide a universal driving connection between the manual valve of the present invention and the thermostatic valve 61, permitting the thermostatic valve 61 to be offset with respect to our manual valve, as shown in Figure 1. The connection of our manual valve with a thermostatic valve enables the latter to be operated to permit a predetermined gas flow therethrough so that the oven will be operated to provide a desired temperature therein

*Arrangement and operation of valve when used to control an oven burner intended for roasting only*

When our valve is to be used to control an oven burner intended for roasting purposes only, it will be connected by piping in the manner shown in solid lines in Figure 1. That is, the oven burner passage 47 will be connected by a pipe 60 with a thermostatic valve of well known construction and generally indicated by the numeral 61 and which includes a thermostatic element 62 positioned in the oven 21. Gas flowing through the thermostatic valve 61 will flow through a section of piping 63 to the oven burner, not shown. It will be understood that, if desired, the thermostatic valve 61 may be eliminated, in which case the pipe 60 will communicate directly with the oven burner. The pilot burner passage 52 will be connected to the pilot burner of the oven by means of a pipe 65. When the valve is used to control an oven of this type, that is, an oven used for roasting purposes only, the broiler passage 50 is closed by a plug as is indicated in solid lines at 66 in Figure 1, since no broiler burner is used in an oven of this type.

In order to limit the rotation of the valve disc 33 with respect to the valve body 28, a stop pin 70 (Figures 9 and 10) is positioned at the lower portion of the valve body 28 and a second stop pin 71 is positioned upon the upper portion of the valve body. The stop arm 42 turning with the valve disc 33 will cooperate with these stop pins to limit the rotation of the valve disc with respect to the valve body.

The operation of the valve of the present invention when connected as shown in solid lines in Figure 1 for the purpose of controlling, through an intermediate thermostatic valve, an oven intended for roasting only, is as follows:—

The position of the valve disc 33 with respect to the valve body 28 when the valve is in closed position is diagrammatically illustrated in Figure 9, the valve disc 33 being shown in this figure in transverse cross-section to show the position of the grooves or passages therein. It will be understood that in Figure 9 and also in Figures 10 to 16, the ports in the valve body 28 are shown slightly narrower in cross-section than they actually are, the valve body ports being illustrated in this manner in order to bring their edge defining lines within the lines defining the edges of the disc passages to make the relative positions of the ports and passages more readily understandable.

As shown in Figure 9, when the valve is in closed position, the stop arm 42 will contact with lower stop pin 70. Also, the pin 40 (Figure 4) carried by the valve shaft 31 will be engaged in the valve body kerf 41. The supply passage 30 of the valve will be closed by a blank portion of the seat face of the valve disc 33, thereby preventing flow of gas from the manifold 25 through this passage and the longer groove or passage 56 of the valve disc 33 will be open to the oven burner passage 47 and the pilot burner passage 52. Furthermore, the shorter groove 57 of the valve disc will be open to the broiler burner passage 50. However, since the passage 50 is closed by the plug 66, there can be no flow through this latter passage under any circumstances.

In order to deliver gas to the thermostatic valve 61 and thence to the oven burner, not shown, the valve disc 33 is rotated in a clockwise direction by means of the operating knob or handle 38, the knob being pushed inwardly to release the shaft pin 40 (Figure 4) from the kerf 41. Such rotation will bring the upper end (Figure 9) of the valve disc groove or passage 56 into communication with the supply passage 30, permitting gas to flow from the latter passage to the port 48 and through passage 47 to the thermostatic valve 61, and also permitting flow of gas to the groove 53 and through passage 52 to the pilot burner, not shown, of the oven, through the pipe 65. Although the amount of gas which will be delivered to the two burners referred to upon the initial communication of the valve disc groove 56 with the supply passage 30 will be relatively small, because of the fact that the end of the disc groove 56 is rounded, a slightly further movement of the valve disc in a clockwise direction will permit a flow of gas of maximum volume, so far as the present valve is concerned. However, as is customary, the actual flow of gas to the oven burner will be finally controlled by the thermostatic valve 61, and the opening of this valve will be regulated by the rotation of the shaft 31 of our manual valve, acting through the rod 68 to control the operating shaft 69 of the thermostatic valve. The degree to which the thermostatic valve is opened will be indicated by the alignment of the various indicia 75 shown upon the dial 37 (Figure 3) at the sight opening 37a in the front plate 22 of the stove. For example, when the numeral 250 appears at the sight opening, the thermostatic valve will be set to hold the oven temperature at 250°.

Figure 10 indicates the position of the grooves or passages of the valve disc 33 with respect to the passages or ports of the valve body 28 when the valve disc has been turned a sufficient extent to bring the numeral 550 into alignment with the sight opening 37a and to set the thermostatic valve for a temperature of 550°. In this position, the gas entering the valve body 28 may flow through the longer groove 56 of the valve disc in the manner shown by the arrows. That is, gas may flow from the supply passage 30 to the left in the groove 56 and to the oven burner passage 47 and thence to the thermostatic valve 61. At the same time, gas may flow to the right from the supply passage 30 and through the disc groove 56 to the pilot burner groove 53 and thence to the pilot burner of the oven. The short groove 57 of the valve disc will also, in this position, be open to the supply passage 30 but since this groove is not in alignment with any other passage in the valve body 28, there will be no flow through the same.

The position of the stop pin 71 is such that when the valve disc has been turned to a position approximating that shown in Figure 10, the stop arm 42 will strike the pin, preventing further clockwise rotation of the valve disc.

It will be understood, as is apparent from the above, that the valve disc may be positioned at any point between the closed position shown in Figure 9 and the 550° position, or full on position, shown in Figure 10 and, whatever the position of the valve disc as indicated by the exposed reading of the dial 37, the thermostatic valve will be set, through the shaft 31, to maintain the oven at the temperature indicated by the dial. Also, at any position of the valve between that shown in Figure 9 and that shown in Figure 10, gas will flow to the pilot burner. Because of this, should the thermostatic valve shut off the flow of gas through the pipe 60, a flame will still be maintained in the oven so that, should the thermostatic valve again permit flow through pipe 60, the oven burner will be ignited.

*Arrangement and operation of valve when used to control a two-compartment oven having a single roasting and broiling burner*

When the valve of our invention is to be used to control a two-compartment oven in which one of the compartments is to be used for roasting and the other compartment is to be used for broiling, with a single burner, preferably in the upper portion of the broiling compartment, to perform both operations, the mode of connection of the valve and its operation are as follows:—

The valve of the present invention would be connected in exactly the same manner as is indicated in solid lines in Figure 1 and as is described above. That is, the supply passage 30 would be connected to the manifold 25, the oven burner passage 47 would be connected to a thermostatic valve such as 61 by a pipe 60, and the pilot burner passage 52 would be connected to a pilot burner, not shown, by pipe 65, but the broiler passage 50 will be closed by plug 66. The shaft 31 of the manual valve of the present invention would also be connected to the operating shaft 69 of the thermostatic valve 61 by rod 68.

Figures 11, 12 and 13 illustrate positions which may be assumed by the valve disc or element 33 during its operation to control an oven of the type discussed above. When the valve is to be used for this purpose, the valve body 28 has affixed thereto a stop pin 70 and also a stop pin 72. The stop pin 70 is fixed in the valve body at the same point as is occupied by the stop pin 70 of Figures 9 and 10 but the stop pin 72 is so positioned that it permits a slightly greater rotation, in a clockwise direction, than does the stop pin 71 of Figures 9 and 10.

Figure 11 shows the valve in closed position and, in this position, the arrangement of the grooves or passages of the valve disc with respect to the ports or passages of the valve body is the same as illustrated in Figure 9. The valve disc may be rotated in a clockwise direction, just as is the valve of Figures 9 and 10, and, during this rotation, the valve of Figure 11 may assume the position which has been illustrated in Figure 10 and already described. At this position, the valve will permit a flow of gas to the thermostatic valve 61 just as has been described above in connection with Figure 10. In other words, the valve disc may be turned to any position between that shown in Figure 11 and that shown in Figure 12.

Figure 12 illustrates a position of the valve which is somewhat past that illustrated in Figure 10. When the valve is at the position of Figure 12, the indicia "Broil" will appear at the sight opening 37a. Referring to Figure 12, it will be seen that the supply passage 30 is open to the longer groove 56 of the valve disc 33 and that gas may flow to the left in the passage 56 to the port 47 communicating with the oven burner. The gas may also flow from the supply passage 30 and through the groove 56 to the pilot light passage 52. The mode of flow of the gas in the position of Figure 12 is therefore the same as is described in connection with Figure 10, that is, a full flow of gas to the oven will occur. However, the slightly greater rotation of the valve shaft 31 will result in a slightly greater opening movement of the thermostatic valve 61 than is the case when the valve disc 33 is positioned as in Figure 10.

In the position of Figure 12, the shorter groove 57 will be open to the supply passage 30, but since the groove 57 is not open to any other passage in the valve body, there will be no flow through the same.

Figure 13 shows a position of the valve disc 33 wherein the disc has been turned to its limit of movement in a clockwise direction, with the stop arm 42 in contact with the stop pin 72. When the valve disc is positioned as in Figure 13, the indicia "Toast" will appear at the sight opening 37a. In this position of the valve, the upper end of the longer disc passage 56 will have moved out of alignment with the port 48 of oven burner passage 47 and will only be open to the groove 49 which extends from this port. Because of this, the flow of gas from the supply passage 30 and through the longer groove 56 to the oven burner passage 47 will be reduced. A low flame is usually desirable for toasting, and this position of the valve will give that result. At the same time, the rotation of the valve shaft 31 to the position shown in Figure 13 will cause the thermostatic valve 61 to be opened to its widest possible position, permitting free flow of gas therethrough.

In the position of Figure 13, gas may also flow to the right in the groove or passage 56 and thence to the pilot burner passage 52. In short, the pilot burner will receive gas during the entire operation of the valve.

*Arrangement and operation of valve when used to control an oven provided with separate broiling and roasting burners*

Figures 14, 15 and 16 illustrate positions of the valve disc 33 when the valve is used to control an oven provided with separate roasting and broiling burners. When the valve is to be used for this purpose, the valve body 28 is provided with a stop pin 71 occupying the same position as the stop pin 71 of Figures 9 and 10. A second stop pin 73 is fixed to the valve body, this latter stop pin being spaced in a counter-clockwise direction from the position of the stop pin 70 of Figures 9 and 11. When the valve is to be used for an oven of the type mentioned above, a pipe 76 will be connected to the broiler burner passage 51 as indicated in dotted lines in Figure 1. The other connections to the valve will be the same as illustrated in solid lines in Figure 1.

As shown in Figure 14, the stop arm 42 is not in contact with a stop pin when the valve disc is in closed position. However, the closed position of the valve will be indicated to the user thereof by the fact that the word "Off" will appear at the sight opening 37a and also because the pin 40 in the valve shaft 31 will, at this time, be engaged in the kerf 41 of the valve body. In the closed position of Figure 14, the arrangement of the grooves or passages with respect to the ports or passages of the valve body 28 is the same as has been described in connection with Figures 9 and 11.

Figure 15 illustrates the position of the valve disc with respect to the valve body when the valve disc has been turned to a position to bring the indicia 550 into alignment with the sight opening 37a and this position of the valve is therefore the same as is illustrated in Figure 10. That is, gas may flow from the supply passage 30, and through the disc groove 56 to the oven burner passage 47. Gas may also flow through groove or passage 52 to the pilot burner, maintaining a flame in the oven in the event that the thermostatic valve 61 should close off the flow of gas through the oven burner passage 47. No flow to the broiler burner will occur since the disc groove 57 does not bridge the supply passage 30 and the broiler passage 51. Figure 15 is the limit position of the disc 33 as turned in a clockwise direction, the stop arm 42 then being in contact with stop pin 71. It will be understood that the valve disc 33 may be turned to any position between that shown in Figure 14 and the full open position shown in Figure 15, and that in any of these possible positions, gas will flow to the roasting burner of the oven through the oven burner passage 47, pipe 60 and through thermostatic valve 61 to the roasting burner and also through pilot burner passage 52 to the pilot burner.

Figure 16 shows the position of the valve disc when gas flows only to the broiler burner of the oven. In this position, attained by rotating the valve disc in a counter-clockwise direction from the closed position of Figure 14, the shorter groove or passage 57 of the valve disc or element 33 will bridge the supply passage 30 and the broiler burner passage 51 and gas will therefore flow to the broiler burner of the oven. The longer groove 56 of the valve disc will not be open to the supply passage 30, and therefore there will be no flow either to the thermostatic valve 61 or through the pilot burner passage 52. A steady flame will be maintained in the broiler burner, it being understood that the height of the flame can be regulated according to the degree of alignment of the shorter disc passage 57 with the supply passage 30. In the position of Figure 16, the stop arm 42 will be in contact with the valve body stop pin 73.

It will be appreciated from the above that the valve of the present invention is readily applicable to numerous types of ranges, the only change necessary in the valve structure being that of varying the positioning of the valve body stop pins and the mode of connection of the valve to the range piping.

It will be understood that, if desired, other kerfs such as the kerf 41 in which the pin 40 engages to hold the valve in closed position may be spaced about the valve body 28 to be engaged by the pin 40 to hold the valve in other positions.

It will be understood that the invention is not limited to the details of construction shown in the drawings and described in the specification and that the examples of the uses of the invention which have been given do not include all of the uses of which it is capable; also, that the phraseology employed in the specification is for the purpose of description and not of limitation.

We claim:—

1. An oven valve for ranges comprising a valve body, a rotatable valve element, said valve body being provided with a plurality of passages opening to the seat face thereof and adapted to be selectively connected to range flow passages, said valve element being provided with a passage adapted to connect predetermined passages of said valve body upon selective rotation of said valve element, and means selectively positioned according to the selective connection made to the range flow passages to limit the rotation of said valve element.

2. An oven valve for ranges comprising a valve body, a rotatable valve element, said valve body having a planar seat face provided with a plurality of passages adapted to be selectively connected to range flow passages, said valve element being disc-like and provided with a passage adapted to connect predetermined passages of said valve body upon selective rotation of said valve element, and means selectively positioned according to the selective connection made to the range flow passages to limit the rotation of said valve element.

3. An oven valve for ranges comprising a valve body and a valve element rotatable with respect thereto, said valve body having a planar seat provided with a supply passage and a plurality of concentrically arranged and arcuate delivery passages, the delivery passages being respectively adapted to be connected to an oven burner and a broiler burner, said valve element being of disc form and provided with an arcuate passage adapted to place the valve body supply passage and oven burner passage in communication during a portion of the rotation of said valve element and said valve element having a second arcuate passage concentrically arranged with respect to said last named passage to place the supply passage and broiler burner passage in communication during another portion of the rotation of said valve element.

4. An oven valve for ranges comprising a valve body and a valve element rotatable with respect thereto, said valve body having a planar seat provided with a supply passage and a plurality of concentrically arranged and arcuate delivery passages, the delivery passages being respectively adapted to be connected to an oven burner, an oven pilot burner and a broiler burner, said valve element being of disc form and provided with an arcuate passage adapted to place the valve body supply passage, oven burner passage and oven pilot passage in communication during a portion of the rotation of said valve element and said valve element having a second arcuate passage concentrically arranged with respect to said last named passage to place the supply passage and broiler burner passage in communication during another portion of the rotation of said valve element.

5. An oven valve for ranges comprising a valve body and a valve element rotatable with respect thereto, said valve body having a planar seat provided with a supply passage and a plurality of concentrically arranged and arcuate delivery passages, the delivery passages being respectively adapted to be connected to an oven burner, an oven pilot burner and a broiler burner, said valve element being of disc form and provided with an arcuate passage adapted to place the valve body supply passage, oven burner passage and oven pilot passage in communication during rotation of said valve element in one direction and said valve element having a second arcuate passage concentrically arranged with respect to said last named passage to place the supply passage and broiler burner passage in communication during rotation of said valve element in a reverse direction.

6. An oven valve for ranges comprising a valve body and a valve element rotatable with respect thereto, said valve element being provided with a pair of concentrically arranged passages radially offset with respect to each other, said valve body being provided with a supply passage and a plurality of delivery passages, the delivery passages being concentrically arranged and radially offset with respect to each other, and the supply passage being of sufficient size radially of said valve body to communicate with either of the valve element passages upon rotation of said valve element.

7. An oven valve for ranges comprising a valve body and a valve element rotatable with respect thereto, said valve element being provided with a relatively long passage and a relatively short passage, which passages are concentrically arranged and radially offset with respect to each other, said valve body being provided with a supply passage and a plurality of delivery passages, the delivery passages being concentrically arranged and radially offset with respect to each other, and the supply passage being of sufficient size radially of said valve body to communicate with either of the valve element passages upon rotation of said valve element.

8. An oven valve for ranges comprising a valve body and a valve element rotatable with respect thereto, said valve element being provided with a pair of concentrically arranged passages radially offset with respect to each other, said valve body being provided with a supply passage and a pair of delivery passages, the delivery passages being concentrically arranged and radially offset with respect to each other, with an end of each on opposite sides of the supply passage, and the supply passage being of sufficient size radially of said valve body to communicate with either of the valve element passages upon rotation of said valve element.

9. An oven valve for ranges comprising a valve body and a valve element rotatable with respect thereto, said valve element being provided with a relatively long passage and a relatively short passage, which passages are concentrically arranged and radially offset with respect to each other, said valve body being provided with a supply passage and a pair of delivery passages, the delivery passages being concentrically arranged and radially offset with respect to each other, with an end of each on opposite sides of the supply passage, and the supply passage being of sufficient size radially of said valve body to communicate with either of the valve element passages upon rotation of said valve element.

10. An oven valve comprising a valve body element and a valve element rotatable with respect thereto, one of said elements being provided with a supply passage and a plurality of concentric delivery passages radially offset with respect to each other, the other of said elements being provided with a plurality of concentrically arranged passages radially offset with respect to each other and adapted to place the supply passage and one of the delivery passages in communication during selective rotation of said valve element, the supply passage being of sufficient size to communicate with any one of said concentric passages during various stages of rotation of said valve element.

BEST PRATT.
GEORGE F. WEINREICH.